May 6, 1941.     V. KINSER     2,240,932
AUTOMATIC SHAFT BRAKE DEVICE
Filed July 24, 1940
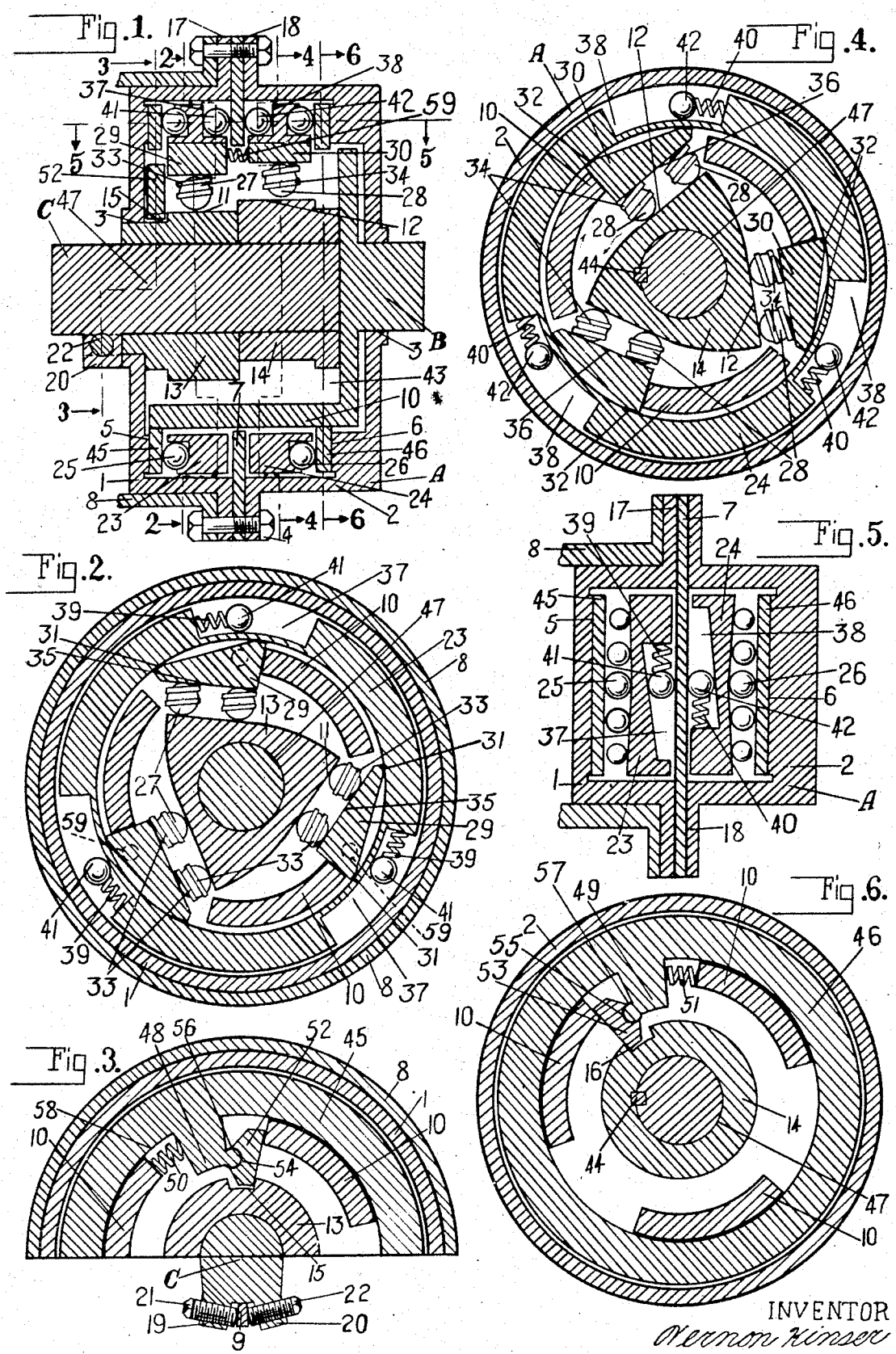
INVENTOR
Vernon Kinser Patented May 6, 1941

2,240,932

UNITED STATES PATENT OFFICE 2,240,932

AUTOMATIC SHAFT BRAKE DEVICE

Vernon Kinser, Butterfield, Mo.

Application July 24, 1940, Serial No. 347,244

11 Claims. (Cl. 192—8)

This invention relates generally to power transmission devices and has more particularly reference to an automatic shaft brake device.

By an automatic shaft brake, I have specific reference to a power transmission device including controlling and controlled members, as driving and driven shafts or the like, wherein movement of the controlling member is necessary to permit and concurrently effect or permit motivation of the controlled member.

More specifically, my invention relates to a shaft brake employing a combination of frictional restraint and direct torque resistance to effect its purpose, which device, in some of its several well known forms, as heretofore employed, for example, in elevator hoists and automotive steering-gears, may be called an irreversible or self-locking gear, as embodied in a worm gear constructed in such a manner that manipulation or semi-manipulation of the worm is necessary to permit rotation of its mating gear-wheel, the lock being effected by the friction between the teeth of the gear-wheel and the worm, which serves to normally hold the gear-wheel against rotation.

Obviously, however, whenever the gear-wheel is carrying a load, the friction between the worm and the wheel is increased proportionately, and hence, in order to release, the worm, as may be said, from its frictional restraint in order to move the wheel, it is requisite to apply sufficient force to overcome the friction between the worm and wheel, and then to add to that force the effort required to effect the desired motivation of the load carried by the wheel, and this condition obtains, with consequent loss of energy required to release the worm from the wheel, whether, as in a hoist, the load is being raised or lowered or whether, as in an automotive steering-gear, the car is being turned, or straightened from a turn, and the like.

My present invention has hence for its prime object the provision of a device of the kind described wherein the controlled member may be restrained against motion which would tend to occur independently of actuation of the controlling member, motivation of the controlled member being wholly under the control of the controlling member, the controlled motion of the controlled member being effected, however, responsively to actuation of the controlling member in the desired direction, with merely a minimum holding or driving torque, that is to say, a substantially less effort than would be required to drive a worm from its frictional lock with its gear-wheel.

And with the above and other objects in view, my invention resides in the novel features of form, construction, arrangement, and combination of parts presently described and pointed out in the claims.

In the accompanying drawings (one sheet)—

Figure 1 is a longitudinal sectional view through an automatic shaft brake of my invention;

Figures 2, 3, 4, 5 and 6 are transverse sectional views of unit, taken respectively on the lines 2—2, 3—3, 4—4, 5—5 and 6—6 on Figure 1.

Referring now more in detail and by reference characters to the drawing, which illustrates practical embodiments of my invention, the main frame of the device comprises a stationary restraining member or housing A, whose interior provides a chamber 42, the housing A being composed of the washer 7, and a pair of opposed housing-members 1, 2. The housing-members 1, 2 are provided with flanges 17, 18, respectively, so that the washer 7 and the housing-members 1, 2, may be rigidly fixed or secured to some available stationary part as the housing of an automotive steering-gear 8, a fragment of which is shown, by means of a suitable number of fastening elements or bolts 4, best seen in Figure 1.

The housing-members 1, 2 are equipped with respective central axially aligned bores 3 coincident with the axis of the washer 7 of the housing A, and are also provided with a pair of friction faces 5, 6, respectively, inwardly presented by the housing-members 1, 2, as best seen in Figure 1.

Interposed between the housing-members 1, 2 is a corresponding pair of complementary braking elements or braking-members 45, 46. The braking-members 45, 46 are disposed for respective operative engagement with the friction faces 5, 6, as also clearly seen in Figure 1.

Connected to the steering wheel of an automobile or some driving machine, as the case may be, is the controlling member of the device or, as it may be designated, the drive-shaft C. The drive-shaft C is journaled in the bore 3 of the housing-member 1 and in the chamber 43 is provided with a hub 47, for purposes now appearing.

Mounted on the hub 47 is a pair of actuating elements or members 13, 14 provided with the pockets 15, 16, respectively, the member 14 being rigidly affixed, by the key 44. The drive-shaft C is provided with a pair of radially extending arms 19, 20, which are equipped with the threaded members or screws 21, 22, respectively. The member 13 is provided with a lug 9 suitably projecting between the screws 21, 22 so that the member 13, being rotatable on the hub 47, can be turned or moved to different positions relative to the member 14 by adjusting the screws 21, 22, as best seen in Figure 3.

The members 13, 14 are each provided with a circumferentially spaced series of tangential actuating cam faces 11, 12, respectively, and preferably three in number, the tangential axes of the several cam faces 11, being oppositely disposed to the tangential axes of the several cam faces 12, as best seen in Figures 2, 4, respectively.

Disposed between the braking-members 45, 46 is two series of circumferentially spaced shoes 29, 30, and numbering the same as the cam faces 11, 12, the springs 59 being disposed suitably between the shoes 29, 30 for yieldingly separating the shoes 29 from the shoes 30, best seen in Figure 1. The shoes 29, 30 are provided respectively with the protuberant knobs or friction surfaces 31, 32 or otherwise adapted for frictional co-operation with the rings 23, 24, respectively. The shoes 29, 30 are also provided with the tangential cam faces 35, 36, respectively, the cam faces 35, 36 being equally disposed, as may be said, or parallel with respect to the cam faces 11, 12, respectively, as best seen in Figures 2, 4.

Between the cam faces 11 and the cam faces 35 is disposed the balls 27, being yieldingly positioned, as may be said, or yieldingly held between the cam faces 11 and the cam faces 35 by means of the springs 33, which are seated suitably on the cam faces 35. In a similar manner, the balls 28 are yieldingly positioned between the cam faces 12 and the cam faces 36 by means of the springs 34, for purposes soon to appear.

The controlled element of the device compromises a rotatable element or, as it may be designated, a driven-shaft B, disposed within the chamber 43 between the braking-members 45, 46. The driven-shaft B is provided with three complementary arcuate members or lugs 10 disposed for selective operative engagement with the shoes 29, 30, best seen in Figures 2, 4, so that the balls 27, 28 will be utilized alternatively so as to effect torque-transmission between the drive-shaft C and the driven-shaft B, which torque-transmission will cause the shoes 29 or 30, as the case may be, to become frictionally engaged with the ring 23 or 24 for movement thereof, unless otherwise restrained, in unison with and by the drive-shaft C and the driven-shaft B, the latter being rotatively supported in the bore 3 of the housing-member 2, and extending for connecting to the actuating elements of a steering-gear or some driving machine, as the case may be.

In actual operation the rings 23, 24 are journaled by the shoes 29, 30, respectively, and the cam faces 11, 12 should be so disposed circumferentially with respect to each other so as to effect a slight lost-motion or movement of the drive-shaft C relatively to the driven-shaft B, to alternative actuation of the shoes 29, 30. Such lost-motion, however, could be so adjusted by means of the screws 21, 22 so as to be practically non-existant, and, yet, wear between the shoes 29, 30 and the rings 23, 24, respectively, would cause a relative amount of lost-motion, which could be eliminated, as desired, by means of the screws 21, 22.

The shoes 29 or 30 are caused to become frictionally engaged with the ring 23 or 24, respectively, whenever the driven-shaft B is caused to rotate in either direction against a rotative bias from the drive-shaft C, for then the balls 27 or 28, due to the tangential axes of the cam faces 11, 35 or cam faces 12, 36, effect a torque-responsive outward pressure of the shoes 29 or 30 against the ring 23 or 24, for, in turn, effecting frictional engagement between the driven-shaft B and the ring 23 or 24 for movement thereof, unless otherwise restrained, in unison with and by the drive-shaft C and the driven-shaft B, the mechanisms contained within the rings 23, 24 and including the balls 27, 28 and the co-operating elements, forming, as may be said, two sets of torque-transmission elements operable in opposite directions.

Extending inwardly from the bore 58 of the braking-member 45 is a finger 48, which is provided with a knob 56 suitably rounded for engagement with the bore 54 of the link 52, the ends of the link 52 being in operative engagement with a lug 10 and an end wall of the pocket 15, respectively, for solidly connecting the braking-member 45 to the drive-shaft C and the driven-shaft B, by means of the link 52 as a differentialing element, in a clockwise direction. Disposed between the finger 48 and a lug 10 is the spring 50 suitably disposed for yieldingly connecting the braking-member 45 to the driven-shaft B in a counterclockwise direction.

In a similar manner, the braking-member 46 is provided with an inwardly extending finger 49, which is provided with a knob 57 for engagement with the bore 55 of the link 53, the ends of the link 53 being in operative engagement with a lug 10 and an end wall of the pocket 16, respectively, for solidly connecting the braking-member 46 to the drive-shaft C and the driven-shaft B, by means of the link 53 as a differentialing element, in a counterclockwise direction. Disposed between the finger 49 and a lug 10 is the spring 51 suitably disposed for yieldingly connecting the braking-member 46 to the driven-shaft B in a clockwise direction. The connections being such that, as may be said, the braking-members 45, 46 are solidly differentially connected to the drive-shaft C and the driven-shaft B in opposite directions with respect to each other, and yieldingly connected to the driven-shaft B in opposite directions reversed relatively to the directions in which the braking-members 45, 46 are solidly connected, as best seen in Figures 3, 6.

The rings 23, 24 are each provided with a circumferentially spaced series of helical pockets 37, 38, respectively, and preferably three in number. In each of the pockets 37, is mounted a ball 41 suitably seated on a spring 39 disposed between the end walls of the pockets 37 and the balls 41 for normally urging the latter outwardly of the pockets 37 for wedging each ball 41 between the inner wall of the pockets 37 and the washer 7, the pockets 38 being similarly equipped with the balls 42 and the springs 40 for co-operation also with the washer 7, as best seen in Figures 1, 5.

The helix of the pockets 37 in the ring 23 is disposed for operative engagement with the balls 41 in opposite directions with respect to operative engagement of the helix of the pockets 38 in the ring 24 with the balls 42, best seen in Figure 5. The balls 41, 42 and the co-operating elements, as the case may be, forming, as may be said, a pair of ratchets or one-way clutches operable in opposite directions.

The braking-member 45 or 46 is effectively restrained against rotation whenever the balls 41 or 42 are caused to effect torque-transmission from the ring 23 or 24 to the housing A, for then the ring 23 or 24, by means of the bearing 25 or 26 is caused to bias the braking-member 45 or 46 into frictional engagement with the housing-members 1 or 2 of the housing A. It follows that, the braking-members 45, 46, being connected to the drive-shaft C and the driven shaft B, by means of the links 52, 53, as has been described, are caused to effectively restrain the drive-shaft C and the driven-shaft B against motion, the braking-members 45, 46, and the co-operating elements, as the case may be, forming, as may be said, a pair of braking elements or brakes respectively operable by the one-way clutches.

The device is susceptible to many and varied applications. Particularly, it is highly adapted to be employed in connecton with automotive steering-gears, the steering wheel of the vehicle being connected to the drive-shaft C and the steering linkage being connected, through a suitable reduction gear, with the driven-shaft B.

As will be understood, in steering an automobile certain vibration forces occur responsive to road shock, the wind, and shifting of the weight of the car, which normally tend to impede the steering of the automobile. Such vibration forces are resisted by the device in co-operation with, and controlled by, the steering wheel, which acts in the following manner:

In such use, referring to Figure 2, let it be supposed, for example, that such vibration forces tend to rotate the driven-shaft B counterclockwise against a controlling or, as may be said, a counteracting force from the drive-shaft C, whereupon, the balls 27, responsive to torque-transmission between the counteracting drive-shaft C and the driven-shaft B, are caused to effect a torque-responsive outward pressure of the shoe 29 against the ring 23, as has been described, for, in turn, effecting frictional engagement between the driven-shaft B and the ring 23.

The counterclockwise rotatory bias of the driven-shaft B, thus, transmitted to the ring 23, tends to roll the balls 41 outwardly of the pockets 37 thereof for wedging each ball 41 between the walls of its pocket 37 and the washer 7, so that the balls 41 are caused to effectively transmit such counterclockwise rotatory bias of the driven-shaft B, from the ring 23 to the housing A. The springs 39, it will be understood, normally effecting such wedging action, so that the ring 23 will have very little or substantially no movement.

It follows that, by reason of such torque-transmission from the ring 23 to the housing A, the braking-member 45 will be effectively biased into frictional engagement with the housing-member 1 of the housing A, as has been described, for, in turn, restraining the drive-shaft C and the driven-shaft B against rotation, it being noted that the braking-member 45 is solidly connected to the drive-shaft C and the driven-shaft B, by means of the link 52, in a clockwise direction. So that, under the influence of the frictional restraint and torque-transmission of the various parts of the device, the driven-shaft B is effectively restrained against rotation in its biased direction.

Against such counterclockwise rotatory bias of the driven-shaft B, however, the balls 28 have no restraining effect, yet, on reversal of the vibrational forces set up in steering the vehicle, the driven-shaft B is biased for clockwise movement, whereupon, the balls 28, responsive to torque-transmission between the counteracting drive-shaft C and the driven-shaft B, cause the shoes 30 to become frictionally engaged with the ring 24, the balls 42 are caused to effect torque-transmission from the ring 24 to the housing A, and the driven-shaft B is again prevented from taking further rotational movement, substantially in the manner previously set forth.

It will be seen, however, again for example, that if such vibration forces tend to rotate the driven-shaft B counterclockwise against a controlling or counteracting rotative bias from the drive-shaft C for restraining the driven-shaft B against rotation, as has been described, and then the controlling or clockwise rotative bias of the drive-shaft C is increased until it is greater than the counterclockwise rotative bias of the driven-shaft B. That the drive-shaft C, due to this change in its rotative bias or, as may be said, due to the torsional balance between the drive-shaft C and the driven-shaft B, the braking-member 45, will be yieldingly disconnected from the drive-shaft C and the driven-shaft B by means of the spring 50, and the rotative bias of the ring 23 will be clockwise, against which the balls 41 have no restraining effect, since the balls 41 tend to roll inwardly in the pockets 37 thereof for releasing the ring 23, for, in turn, effecting unrestrained torque-transmission from the drive-shaft C to the driven-shaft B.

Likewise, if the driven-shaft B is biased for clockwise rotative movement and the drive-shaft C has a greater counterclockwise rotative bias, the braking-member 46 will be yieldingly disconnected from the drive-shaft C and the driven-shaft B. The balls 42 will roll inwardly in the pockets 38 thereof for releasing the ring 24, and the drive-shaft C will again effect unrestrained torque-transmission to the driven-shaft B.

A counteracting rotative bias from the drive-shaft C for restraining the driven-shaft B against rotation, is effected by means of the self-energizing effect of connecting the drive-shaft C to the braking-members 45, 46. For, it will be noted, the more torque that is transmitted from the ring 23 or 24 to the housing A, the more effectively the braking-member 45 or 46 will be restrained for effecting a counteracting rotative bias on the drive-shaft C, which, as hereinbefore set forth, will effect more torque-transmission from the ring 23 or 24 to the housing A. The restraint of the driven-shaft B being, thus, energized from within the device itself.

It may also be here said that, such a self-energizing restraint of the drive-shaft C for counteracting against rotation of the driven-shaft B, can be removed, as desired, by manipulation of the steering wheel. It being understood, that rotation of the drive-shaft C will correspondingly displace the self-energizing restraint thereof.

Thus, it will be seen, motivation of the driven-shaft B by the drive-shaft C is concurrent to actuation respectively of the balls 27 or 28 by the drive-shaft C, the helix of the pockets 37, 38 being disposed so as to allow movement of the rings 23, 24 in particular directions for unrestrained torque-transmission from the drive-shaft C to the driven-shaft B. The restraint of the driven-shaft B being, however, automatic and only to restrain the driven-shaft B against torque-transmission to the drive-shaft C.

In use and operation, it will be seen that, when applied, in connection with the conventional type of steering-gear for use on automobiles, the steering-gear can be made highly efficient, and by use of the frictional restraint of my automatic shaft brake, a high degree of irreversibility may be had, as the term is commonly applied, and yet have a high rate of steering efficiency. It will be obvious, therefore, that less physical and mental effort will be necessary to control an automobile under the various steering conditions.

It will be understood that, if desired, the braking-members 45, 46 could be connected to the drive-shaft C or the driven-shaft B by means of a suitable arrangement of ratchets or one-way clutches, and likewise that other changes and modifications in the form, construction, arrangement, and combination of the several parts of the automatic shaft brake devices may be made and substituted for those herein shown and described without departing from the nature and principles of my invention.

Having thus described my invention, what I claim and desire to secure by Letters Patent is:

1. In a device of the kind described, in combination, co-axial driving and driven shafts, automatic mechanism for restraining said driven shaft against torque-transmission to said drive shaft in either direction and, for effecting unrestrained torque-transmission from said drive shaft to said driven shaft in either direction, said mechanism including first and second rings mounted for limited revolution bodily about the co-axis of said drive and driven shafts, oppositely acting sets of torque-transmission elements operatively connected to said drive and driven shafts and, adapted for frictional co-operation respectively with said rings, oppositely acting means disposed for restricting the motion of said rings, braking means actuable responsively to torque-transmission by said oppositely acting means, and elements adapted to connect said braking means to said drive and driven shafts.

2. In a device of the kind described, in combination, co-axial driving and driven shafts, automatic mechanism for restraining said driven shaft against torque-transmission to said drive shaft in either direction and, for effecting unrestrained torque-transmission from said drive shaft to said driven shaft in either direction, said mechanism including first and second rings mounted for limited revolution bodily about the co-axis of said drive and driven shafts, two sets of shoes adapted for frictional co-operation respectively with said rings, first sets of first and second cam faces included by one of said shafts and, being oppositely disposed with respect to each other, second sets of first and second cam faces included by said sets of shoes respectively and, being equally disposed with respect to said first sets of first and second cam faces respectively, means including balls yieldingly positioned between said first sets of first and second cam faces and said second sets of first and second cam faces respectively for engagement therewith, means included by the other of said shafts for selective operative engagement with said shoes, and oppositely acting one-way clutches disposed for restricting the motion of said rings.

3. In a device of the kind described, in combination, co-axial driving and driven shafts, automatic mechanism for restraining said driven shaft against torque-transmission to said drive shaft in either direction and, for effecting unrestrained torque-transmission from said drive shaft to said driven shaft in either direction, said mechanism including first and second rings mounted for limited revolution bodily about the co-axis of said drive and driven shafts, two sets of shoes adapted for frictional co-operation respectively with said rings, first sets of first and second cam faces included by one of said shafts and, being oppositely disposed with respect to each other, means including threaded members adapted to adjust the position of said first sets of first and second cam faces with respect to each other, second sets of first and second cam faces included by said sets of shoes respectively and, being equally disposed with respect to said first sets of first and second cam faces respectively, means including balls yieldingly positioned between said first sets of first and second cam faces and said second sets of first and second cam faces respectively for engagement therewith, means included by the other of said shafts for selective operative engagement with said shoes, and oppositely acting one-way clutches disposed for restricting the motion of said rings.

4. In a device of the kind described, in combination, co-axial driving and driven shafts, automatic mechanism for restraining said driven shaft against torque-transmission to said drive shaft in either direction and, for effecting unrestrained torque-transmission from said drive shaft to said driven shaft in either direction, said mechanism including first and second rings mounted for limited revolution bodily about the co-axis of said drive and driven shafts, two sets of shoes adapted for frictional co-operation respectively with said rings, first sets of first and second cam faces included by one of said shafts and, being oppositely disposed with respect to each other, second sets of first and second cam faces included by said sets of shoes respectively and, being equally disposed with respect to said first sets of first and second cam faces respectively, means including balls yieldingly positioned between said first sets of first and second cam faces and said second sets of first and second cam faces respectively for engagement therewith, means included by the other of said shafts for selective operative engagement with said shoes, a non-rotatable restraining member, a pair of braking elements adapted for frictional co-operation with said restraining member and, being solidly differentially connected to both of said shafts in opposite directions with respect to each other and yieldingly connected to one of said shafts in opposite directions reversed relatively thereto, and oppositely acting one-way clutches respectively operatively connected to said braking elements and disposed for restricting the motion of said rings.

5. In a device of the kind described, in combination, co-axial driving and driven shafts, automatic mechanism for restraining said driven shaft against torque-transmission to said drive shaft in either direction and, for effecting unrestrained torque-transmission from said drive shaft to said driven shaft in either direction, said mechanism including first and second rings mounted for limited revolution bodily about the co-axis of said drive and driven shafts, two sets of shoes adapted for frictional co-operation respectively with said rings, first sets of first and second cam faces included by one of said shafts and, being oppositely disposed with respect to each other, means including threaded members adapted to adjust the position of said first sets of first and second cam faces with respect to each other, second sets of first and second cam faces included by said sets of shoes respectively and, being equally disposed with respect to said first sets of first and second cam faces respectively, means including balls yieldingly positioned between said first sets of first and second cam faces and said second sets of first and second cam faces respectively for engagement therewith, means included by the other of said shafts for selective operative engagement with said shoes, a non-rotatable restraining member, a pair of braking elements adapted for frictional co-operation with said restraining member and, being solidly differentially connected to both of said shafts in opposite directions with respect to each other and yieldingly connected to one of said shafts in opposite directions reversed relatively thereto, and oppositely acting one-way clutches respectively operatively connected to said braking elements and disposed for restricting the motion of said rings.

6. In a device of the kind described, in combination, co-axial driving and driven shafts, automatic mechanism for restraining said driven shaft against torque-transmission to said drive shaft in either direction and, for effecting unrestrained torque-transmission from said drive shaft to said driven shaft in either direction, said mechanism including first and second rings mounted for limited revolution bodily about the co-axis of said drive and driven shafts, oppositely acting sets of torque-transmission elements operatively connected to said drive and driven shafts and, adapted for frictional co-operation respectively with said rings, means including threaded members adapted to adjust the effectiveness of said sets of torque-transmission elements with respect to each other, a non-rotatable restraining member, said restraining member including a washer, a pair of helical pockets included by said first and second rings, a ball yieldingly wedged between the inner wall of each of said pockets and said washer, each of said pockets being adapted to effect torque-transmission by said balls to said restraining member in one way only and in opposite directions with respect to the other and a pair of braking elements respectively actuable responsively to torque-transmission by said balls and, adapted for frictional co-operation with said restraining member, said braking elements being solidly differentially connected to both of said shafts in opposite directions with respect to each other and yieldingly connected to one of said shafts in opposite directions reversed relatively thereto.

7. In a device of the kind described, in combination, co-axial driving and driven shafts, automatic mechanism for restraining said driven shaft against torque-transmission to said drive shaft in either direction and, for effecting unrestrained torque-transmission from said drive shaft to said driven shaft in either direction, said mechanism including first and second rings mounted for limited revolution bodily about the co-axis of said drive and driven shafts, oppositely acting sets of torque-transmission elements operatively connected to said drive and driven shafts and, adapted for frictional co-operation respectively with said rings, a non-rotatable restraining member, a pair of braking elements adapted for frictional co-operation with said restraining member and, being solidly differentially connected to both of said shafts in opposite directions with respect to each other and yieldingly connected to one of said shafts in opposite directions reversed relatively thereto, and oppositely acting one-way clutches respectively operatively connected to said braking elements and disposed for restricting the motion of said rings.

8. In a device of the kind described, in combination, co-axial driving and driven shafts, automatic mechanism for restraining said driven shaft against torque-transmission to said drive shaft in either direction and, for effecting unrestrained torque-transmission from said drive shaft to said driven shaft in either direction, said mechanism including first and second rings mounted for limited revolution bodily about the co-axis of said drive and driven shafts, oppositely acting sets of torque-transmission elements operatively connected to said drive and driven shafts and, adapted for frictional co-operation respectively with said rings, means including threaded members adapted to adjust the effectiveness of said sets of torque-transmission elements with respect to each other, a non-rotatable restraining member, a pair of braking elements adapted for frictional co-operation with said restraining member and, being solidly differentially connected to said drive and driven shafts in opposite directions with respect to each other and yieldingly connected to one of said shafts in opposite directions reversed relatively thereto, and oppositely acting one-way clutches respectively operatively connected to said braking elements and disposed for restricting the motion of said rings.

9. In a device of the kind described, in combination, co-axial driving and driven shafts, automatic mechanism for restraining said driven shaft against torque-transmission to said drive shaft in either direction and, for effecting unrestrained torque-transmission from said drive shaft to said driven shaft in either direction, said mechanism including first and second rings mounted for limited revolution bodily about the co-axis of said drive and driven shafts, two sets of shoes in contact respectively with said rings, means for yieldingly separating one of said sets of shoes from the other of said sets of shoes, said sets of shoes being adjustably connected to said drive and driven shafts, in a manner to alternatively effect frictional engagement between said driven shaft and one or the other of said rings responsively to torque-transmission between said drive and driven shafts, and oppositely acting one-way clutches disposed for restricting the motion of said rings.

10. In a device of the kind described, in combination, co-axial driving and driven shafts, automatic mechanism for restraining said driven shaft against torque-transmission to said drive shaft in either direction and, for effecting unrestrained torque-transmission from said drive shaft to said driven shaft in either direction, said mechanism including first and second rings mounted for limited revolution bodily about the co-axis of said drive and driven shafts, two sets of shoes in contact respectively with said rings, means for yieldingly separating one of said sets of shoes from the other of said sets of shoes, said sets of shoes being adjustably connected to said drive and driven shafts, in a manner to alternatively effect frictional engagement between said driven shaft and one or the other of said rings responsively to torque-transmission between said drive and driven shafts, a non-rotatable restraining member, a pair of braking elements adapted for frictional co-operation with said restraining member and, being solidly differentially connected to both of said shafts in opposite directions with respect to each other and yieldingly connected to one of said shafts in opposite directions reversed relatively thereto, and oppositely acting one-way clutches respectively operatively connected to said braking elements and disposed for restricting the motion of said rings.

11. In a device of the kind described, in combination, co-axial driving and driven shafts, automatic mechanism for restraining said driven shaft against torque-transmission to said drive shaft in either direction and, for effecting unrestrained torque-transmission from said drive shaft to said driven shaft in either direction, said mechanism including first and second rings mounted for limited revolution bodily about the co-axis of said drive and driven shafts, two sets of shoes in contact respectively with said rings, means for yieldingly separating one of said sets of shoes from the other of said sets of shoes, said sets of shoes being adjustably connected to said drive and driven shafts, in a manner to alternatively effect frictional engagement between said driven shaft and one or the other of said rings responsively to torque-transmission between said drive and driven shafts, a non-rotatable restraining member, a pair of braking elements adapted to co-operate with said restraining member for restraining said drive and driven shafts against rotation, and oppositely acting one-way clutches respectively operatively connected to said braking elements and disposed for restricting the motion of said rings.

VERNON KINSER.